US012798425B2

(12) United States Patent
Trigoso Papoila et al.

(10) Patent No.: US 12,798,425 B2
(45) Date of Patent: Nov. 17, 2026

(54) SYSTEM FOR CHARGING ELECTRIC VEHICLES WITH SHARED RESOURCES

(71) Applicants: Antonio Luis Trigoso Papoila, Lisbon (PT); Fernando Manuel Patrício Horta, Sobreda (PT)

(72) Inventors: Antonio Luis Trigoso Papoila, Lisbon (PT); Fernando Manuel Patrício Horta, Sobreda (PT)

( * ) Notice: Subject to any disclaimer, the term of this patent is extended or adjusted under 35 U.S.C. 154(b) by 727 days.

(21) Appl. No.: 18/262,109

(22) PCT Filed: Jan. 20, 2022

(86) PCT No.: PCT/IB2022/050465
§ 371 (c)(1),
(2) Date: Jul. 19, 2023

(87) PCT Pub. No.: WO2022/157658
PCT Pub. Date: Jul. 28, 2022

(65) Prior Publication Data

US 2024/0083285 A1 Mar. 14, 2024

(30) Foreign Application Priority Data

Jan. 20, 2021 (PT) ........................................ 117023

(51) Int. Cl.

| | |
|---|---|
| ***B60L 53/63*** | (2019.01) |
| ***B60L 53/30*** | (2019.01) |
| ***B60L 53/57*** | (2019.01) |
| ***B60L 55/00*** | (2019.01) |
| ***B60L 58/12*** | (2019.01) |
| ***H02J 7/80*** | (2026.01) |

(Continued)

(52) U.S. Cl.
CPC ............. *B60L 53/63* (2019.02); *B60L 53/305* (2019.02); *B60L 53/57* (2019.02); *B60L 55/00* (2019.02);

(Continued)

(58) Field of Classification Search
CPC ........ B60L 53/63; B60L 53/57; B60L 53/305; B60L 55/00; H02J 13/38; H02J 13/1333; H02J 7/80

(Continued)

(56) References Cited

U.S. PATENT DOCUMENTS

2011/0106329 A1 5/2011 Donnelly et al.
2011/0140656 A1 6/2011 Starr et al.

(Continued)

FOREIGN PATENT DOCUMENTS

EP 2156978 A2 2/2010
EP 2810816 * 12/2014

(Continued)

OTHER PUBLICATIONS

International Search Report and Written Opinion for Corresponding International Application No. PCT/IB2022/050465, 18 pages, Dec. 5, 2022.

*Primary Examiner* — Nathaniel R Pelton
(74) *Attorney, Agent, or Firm* — LUCAS & MERCANTI, LLP

(57) ABSTRACT

A system for charging electric vehicles in parking places and garages of multi-family or business buildings. The system allows, via a IoT network-controlled charging unit, to transfer charge between one or more local energy sources and one or more electric vehicles, to which system a charging management methodology is associated. Its design allows not only to meet the needs of time sharing and assignment of resources provided at the installation sites, but also to switch between energy supply networks provided at the installation site in order to increase the availability and the available charging capacity for charging the vehicles.

11 Claims, 5 Drawing Sheets

(51) Int. Cl.

| | |
|---|---|
| ***H02J 13/13*** | (2026.01) |
| ***H02J 13/38*** | (2026.01) |
| *H02J 13/10* | (2026.01) |
| *H02J 105/52* | (2026.01) |

(52) U.S. Cl.
CPC ................ *B60L 58/12* (2019.02); *H02J 7/80* (2026.01); *H02J 13/1333* (2026.01); *H02J 13/38* (2026.01); *B60L 2250/12* (2013.01); *H02J 13/10* (2026.01); *H02J 13/1337* (2026.01); *H02J 2105/52* (2026.01); *H02J 2207/40* (2020.01)

(58) Field of Classification Search
USPC ........................................................... 320/109
See application file for complete search history.

(56) References Cited

U.S. PATENT DOCUMENTS

| | | | | |
|---|---|---|---|---|
| 2013/0041851 | A1 | 2/2013 | Judkovics | |
| 2017/0078400 | A1 | 3/2017 | Binder et al. | |
| 2017/0093155 | A1 | 3/2017 | Hannah et al. | |
| 2022/0185408 | A1 * | 6/2022 | Askin ...................... | B62H 3/04 |

FOREIGN PATENT DOCUMENTS

| | | | |
|---|---|---|---|
| EP | 2810816 | A2 | 12/2014 |
| EP | 2537224 | B1 | 6/2020 |
| WO | 2011019509 | A1 | 2/2011 |
| WO | 2011091444 | A1 | 7/2011 |
| WO | 2011102855 | A1 | 8/2011 |

* cited by examiner

SYSTEM FOR CHARGING ELECTRIC VEHICLES WITH SHARED RESOURCES

CROSS-REFERENCE TO RELATED APPLICATIONS

This application is a 371 of PCT/IB2022/050465, filed Jan. 20, 2022, which claimed the priority of Portuguese Application No. 117023, filed Jan. 20, 2021, the contents of each of which are incorporated herein by reference.

BACKGROUND

Currently, there is a huge evolution in the field of both electric vehicles and hybrid vehicles that can be observed in all technological aspects characterizing electric mobility.

Resulting from the automobile industry efforts, vehicles have been more advanced, where the more efficient and best-performing engines, and also lighter and longer-lasting batteries' new technologies stand out. The massification of electric mobility depends on increasing the production of electric and hybrid vehicles, which is achieved through the reduction of production costs and the consequent increase in sales of low-priced vehicles.

This accretion in electric and hybrid vehicles in circulation has not been followed by an increase in the number of infrastructures available for battery charging. Charging possibilities can be residential, such as when the vehicle is in the garage charging batteries overnight through a charging process that can be slow or fast, depending on the type of charger used, or by using fast charging stations that can be found at service stations, public or private parking lots providing charger sockets for fast charging.

The access to fast charging services presents several constraints, among which it is possible to highlight the lack of availability of charging stations, the growing number of competing users, the long duration of charging and consequent waiting time, accessibility to the charging station, and the operational state of the equipment.

For example, a solution for a communications network that aims to help find an available charging station, control the respective charging equipment, and pay for the energy consumed in the vehicle charging is known in the state-of-the-art. However, this solution does not solve most critical situations related to the waiting time during the vehicle charging, the trip to the charging station, the number of competing users and the consequent lack of availability of infrastructures for charging.

On the other hand, power distribution networks also face a great challenge in adapting to the reality of electric mobility. Many networks, especially urban networks, have not been dimensioned, and are not prepared, for the growing increase of energy consumption that is currently occurring related to the growing number of vehicles connected to the electric grid, and charging simultaneously.

The impact on electric power distribution networks when charging thousands of electric vehicles simultaneously is significant, for example, by overloading production centers, transmission and distribution lines.

There is, therefore, a need to develop solutions allowing to optimize the value of distributed resources, contributing to a more efficient and intelligent system for charging electric vehicles that is more decentralized, and at the same time more interconnected, thereby allowing for increased reliability, safety, environmental sustainability, and energy efficiency.

SmartGrids aim to mitigate the aforementioned problems and create solutions that meet the challenges posed by the development of SmartCities and electric mobility.

The global expansion of the Internet of Things (IoT), which is mainly seen in cities and large urban centers, is of crucial importance for interconnecting Smartcities and SmartGrids. However, in the same way that Grids need to adapt, Cities also have to create solutions for buildings, parking lots, streets, recreational areas, in order to efficiently meet the expectations of local populations.

Users of electric vehicles are currently limited to a small number of alternatives for charging their vehicle batteries, which, despite incentives to change, lead to a discouragement of the use of electric vehicles, favoring the use of vehicles with internal combustion engines.

In urban centers, most private parking areas are located at the lower floors of multi-family residential buildings in the form of individual parking spaces or individual garages. Normally, in these buildings, the electric installation of the areas considered common or shared is intended for automatisms, such as elevators, doors, security systems, communication systems, TV signal distribution equipment, and other services, the lighting of floors and safety stairways, and service sockets for connecting small appliances on the floors and in parking areas.

Thus, electric power available for common use in residential buildings is limited to the consumption predicted when the building was constructed, and an increase in the installation's power requires considerable changes such as the replacement of protection switchboards, connections, and wiring.

At present, a solution allowing the connection of electric vehicle chargers is known in the state-of-the-art, which solution involves the installation of a new "prefabricated" cable specially designed and prepared for this application. This type of solution has the disadvantage of requiring a change in the electric installation approved in the building project, which according to current legislation is not permitted in many countries.

Thus, the cost of electric energy consumed for these parking areas is usually shared by the residents or condominium owners. This means that users of electric vehicles living in buildings with individual parking places or garages that do not have private electric installations are unable to charge the batteries of their electric vehicles without overcharging the energy costs of the common parts of the building.

On the other hand, a simultaneous charging of the batteries of several electric vehicles via a connection to the common service sockets in parking places or garages will overload the electric installation of the common areas, with the risk of exceeding the nominal power installed, leading to trigger the protection devices.

Furthermore, a charging solution consisting of connecting the vehicle to a lighting circuit in the parking lot or parking place, by means of a bracket (or mechanical arm) or socket and with an electric cable connected to the wires where a lamp was previously connected is known from the present state-of-the-art.

Considering the increase in the range of current electric vehicles as a consequence of the increase in the energy capacity of batteries, the need to provide more energy for battery charging also increases. Thus, in a lamp circuit, charging a single electric vehicle goes very slowly due to the limitation of energy supply, making it discouraging when there are several competing electric vehicles to be charged at the same time. Also, this solution does not solve the issue of higher shared energy costs with common areas and services.

According to the above-mentioned points, it is thus impossible to charge several electric vehicles simultaneously in parking spaces or garages in residential buildings using the common electric installation.

The present application therefore aims to describe a solution capable of solving all the currently known and previously identified problems of the present state-of-the-art.

SUMMARY

The present application describes a system for charging electric vehicles in parking places and garages of multi-family or business buildings, characterized in that it comprises at least one connection to a local power distribution network; at least one electric switchboard, comprising one energy meter connected to the local power distribution network through an electric grid connection and local protections; and at least one charging unit having at least one inlet connected to the at least one electric switchboard, comprising an automatic changeover switch for energy transfer; one energy meter connected to the changeover switch; a tampering sensor; a controller module connected to the automatic changeover switch, the energy meter and the tampering sensor, comprising at least one port adapted for communications with the connections to the changeover switch, to the meter, and to the sensor, and one mobile communications module; a circuit breaker connected to the energy meter; at least one smart socket to which electric vehicles are connected, the smart socket being connected to the circuit breaker; an RGB LED light for operation status indication of the charging unit; and a capacitive sensor for interaction with the vehicle user.

In an embodiment provided, the automatic changeover switch for energy transfer is adapted to switch the at least one inlet of the charging unit between the local power distribution network and/or an off-grid auxiliary circuit comprising renewable energy generation systems and/or energy storage systems in order to increase the power available for the vehicles charging.

Yet in another embodiment, the energy meter comprises a power switch adapted to control the output power of the at least one smart socket.

Yet in another embodiment, the mobile communications module is adapted to communicate with a global information and management system.

Yet in another embodiment, the global information and management system is adapted to control and manage the charging of the vehicles connected to the at least one smart socket through a time-sharing system for electric energy supply which manages the available power of the building electric network by means of a permanent supervision and alarming.

Yet in another embodiment, the time-sharing system for electric energy supply is adapted to enable to charge the vehicles connected to the at least one smart socket without exceeding the available power of the local power distribution network and/or the building.

Yet in another embodiment, the charging unit is adapted to replace the service sockets installed in the parking places or garages of the buildings.

Yet in another embodiment, the global information and management system comprises a "Peak Shaving" mode wherein the electric vehicle charging is carried out through the auxiliary circuit of the renewable energy Generation System and/or the energy stored in energy storage systems; and a "Last Gasp" mode which, in case of failure of the power supply to the vehicle, sends a notification to the user and adapts the charging Units to the off-grid auxiliary circuit, evaluating the available charging power and rearranging the time fractions of vehicles with pending charging.

Yet in another embodiment, the energy meter comprises terminals for connections to at least one Phase and Neutral; a mobile communications module; at least one controller with internal memory, adapted to perform measurements of the electric network; a real-time clock and an internal battery to feed the controller internal memory; and one port for communication with the mobile communications module; wherein the controller internal memory comprises records of imported active energy and active energy at least in one Phase; Voltage instantaneous values in at least one Phase, Current Intensities in at least one Phase, Frequency, Consumed Power and Power Factor, and critical and non-critical Alarms.

Yet in another embodiment, the at least one smart socket comprises a sliding obstructive lid, an electromechanical interlock, and a socket, the interlock being responsible for the automatic displacement of the obstructive lid, ensuring safety and protection of the socket against undue actions.

Yet in another embodiment, the smart socket's sliding obstructive lid has three operating positions comprising: a. obstructive lid blocked in the safety position wherein no vehicle charging connector is inserted in the socket; b. obstructive lid unblocked; c. obstructive lid blocked in the safety position with a vehicle charging connector inserted in the socket.

Yet in another embodiment, the RGB LED comprises three colors Blue-Green-Red indicating the charging status and mode of the charging unit wherein:

- LED OFF indicates that the unit is not in a charging mode and presents the sliding obstructive Lid blocked in the safety position with no charging connector in the Socket;
- BLUE LED ON indicates that the unit is in a charging mode (ON_GRID) and presents the sliding obstructive Lid blocked in the safety position with a charging connector in the Socket, and that it is not charging a vehicle;
- BLUE LED BLINKING indicates that the unit is in a charging mode (ON_GRID), presents the sliding obstructive Lid blocked in the safety position with a charging connector inserted in the Socket, and that it is charging a vehicle;
- GREEN LED ON indicates that the charging unit is in a charging mode (OFF GRID), has the obstructive Lid blocked in the safety position with a charging connector in the Socket, and that it is not charging a vehicle;
- GREEN LED BLINKING indicates that the unit is in a charging mode (OFF GRID) has the obstructive Lid blocked in the safety position with a charging connector in the Socket and that it is charging a vehicle;
- RED LED ON indicates that the unit is in a charging mode, has the obstructive Lid blocked in the safety position with a charging connector in the Socket, and that the charging has been completed;
- RED LED BLINKING FAST indicates that the unit is in a communication mode and has the obstructive Lid unblocked;
- RED LED BLINKING SLOW indicates that the unit is in an ALARM mode, the obstructive Lid is unblocked, and the Socket has no power.

Yet in another embodiment, the time-sharing system for power supply is adapted to:

- communicate with the Charging Units, and initiate or end the charging process of electric vehicles;
- communicate with the energy meter to perform a reading and/or to control the instantaneous power consumption of the system, ensuring the compliance of the available network power limits, sending Maximum Power Limit alarms to the Management Unit, verifying charging Units in charging mode, actuating and selecting which of the less priority charging should be switched off;
- communicate with the controller Module such that it stops charging by opening the circuit of the meter PCS, or disconnect the smart socket in the Charging Unit, and
- activate the interrupted charging when the power of the available network returns to safe-considered values.

Yet in another embodiment, the charging unit is adapted to allow a bidirectional transfer of power, on-grid or off-grid, between one electric vehicle and a power system through the auxiliary connection; another electric vehicle plugged into a socket of the same charging unit; and another electric vehicle plugged into a socket of a different Charging unit as long as they use the same phase of the circuit.

The present application further describes a method of charging electric vehicles according to the system for charging electric vehicles described above, characterized in that it comprises the following steps:

- the electric vehicle user initiates the process using a Smartphone application that collects information about the status of charge (SoC) of the electric vehicle's batteries via wireless communication,
- the user, with the Smartphone application, reads the QR code provided on the front cover of the Charging Unit in order to associate it with his/her electric vehicle and
- the Smartphone application communicates with the Management Unit, informing about the association of the Charging Unit with the vehicle, the SoC of the batteries, the minimum allowable range, and the date/time limit for the end of the charging,
- the Management Unit validates the user in the charging System and determines a time fraction to supply charging power to the electric vehicle, wherein,
- if the charging can be carried out according to the user/electric vehicle requirements, the application on the Smartphone receives a request for the user to confirm the charging acceptance, and
- if the charging cannot be carried out according to the requirements that were defined, the Management Unit re-evaluates which is the best time fraction and sends a new proposal to the application on the SmartPhone, wherein
- if the proposal is accepted
- the user confirms the acceptance of the charging, and upon user acceptance, the Management Unit sends a command ordering the charging unit to unblock the Lid and get the Smart Socket ready for connection;
- the user plugs the connector of the electric vehicle connection cable into the Smart Socket and presses the capacitive sensor to inform the controller and communications Module that the connector is inserted,
- the charging Unit receives from the Management Unit the information to block the Lid and get the Unit ready to charge,
- the charging of the vehicle is initiated and ended with the Management Unit commands, and, as soon as it is ended, an end of charging notification is sent to the user,
- in order to unplug the connector, the user accepts the notification on the Smartphone and thereby unblocks the Lid of the Smart Socket,
- after unplugging the connector, the user presses the capacitive sensor to inform the controller and communications Module that the connector is unplugged,
- the Lid slides down and blocks the access to the Smart Socket ending the charging process,
- if the proposal is not accepted, the Management Unit makes a new proposal with a requirement modification.

BRIEF DESCRIPTION

The present invention refers to a system for charging electric vehicles via a network-controlled charging unit, transferring charge between a local power source and an electric vehicle, to which a charging management methodology is associated.

The electric vehicle charging system provided comprises:

- at least one charging unit for electric vehicles;
- at least one energy meter equipped with a remote communication module;
- at least one electric switchboard for distribution and protection of the electric installation;
- a global information and management system for remote control of the charging processes;

Said charging system is configured by:

- installing an energy meter equipped with a remote communication module;
- installing each one of the charging units in replacement of the service sockets in parking lots or garages in the building;
- installing and configuring the global information and management software of the charging;
- installing a mobile phone (Smartphone or the like) application for communication with the global charging information and management software;
- installing a mobile phone (Smartphone or the like) application for wireless communications with the electric vehicle for information on the battery's status of charge (SoC) via a System-on-a-chip.

With the solution herein provided, it becomes possible to install multiple charging units in parallel, thereby making it possible to simultaneously charge multiple electric vehicles without overloading the infrastructure of the electric network installed.

The charging unit for electric vehicles comprises:

- an energy meter equipped with a power switch and an output for connection to a communications module;
- a controller module and communications module with at least one wired communications port, at least one wireless communications port (Wireless LAN or the like) and at least one internal modem for mobile wireless communications (for example, LTE or the like);
- an automatic changeover switch for energy transfer;
- a circuit breaker for socket protection;
- an RGB LED for indication of the charging unit operating status;
- a capacitive sensor for interaction with the user;
- at least one smart socket for connection of the electric vehicle charging cable.

The energy meter equipped with a remote communication module comprises:

- a controller for energy measurement, which controller comprises a memory;
- a real-time clock (RTC);

an internal battery to feed the RTC and the controller memory;

at least one external wired or wireless communications port;

at least one internal modem for LTE mobile communications or the like.

The charging unit for electric vehicles communicates with a server installed in a Wide Area Network (WAN), or another similar, non-limited one, or further with a Blockchain-based platform allowing a decentralization of the application, thereby ensuring application security. The server may comprise a user database and the Blockchain platform a structure with Smart contracts.

Both the server with the database and the Blockchain platform with the Smart contracts are provided with a data structure comprising:

information on the electric vehicles charging units;

information on the clients of the service (building, condominium, parking lot or other);

information on the users' profiles;

information on the electric vehicles associated to the users;

information on the charging requests;

information on the charging status;

information on the energy consumptions associated to each user;

information on the energy tariffs.

The server includes at least one application for charging management provided with a set of functionalities comprising:

communication with the energy meter equipped with a remote communication module for reading data related to the energy supplied to the charging system, in particular, imported active energy Totalizer, active energy Totalizers per phase L1-L2-L3, instantaneous values of Voltage and Current Intensities for each phase, Frequency, Power, Power Factor, critical and non-critical Alarms; and parametrization of records, in particular, clock adjustment, alarm reset and Power Control Switch command;

communication with each one of the charging units for electric vehicles by means of the internal mobile communication modem in the controller and communications module for meter readings, in particular, imported active energy Totalizers, instantaneous values of Voltage and Current Intensity, Frequency, Power, Power Factor, critical and non-critical Alarms;

control and parametrization of the meter, in particular, clock adjustment, alarm reset and Power Control Switch command;

control of the automatic changeover switch for energy transfer (on Grid/off Grid);

communication with the users via SMS, email or similar notifications, including information about the evolution state of the charging processes, energy consumptions, charging schedules, schedule availability for the charging, condominium energy tariffs;

communication via an application installed in the mobile phones (Smartphones or the like) of the users for the registration of users and electric vehicles, charging requests, charging scheduling, information about the charging processes status, energy consumptions, schedule availability for the charging, condominium energy tariffs;

requests for electric vehicles charging management through the assignment of time-slots for charging considering the list of vehicles that are connected:

in waiting mode;

in charging mode;

in charged mode;

charging time-slots management through the evaluation of available power for each electric vehicle charging unit;

communication with the Blockchain platform's Smart contracts for the registration of users and electric vehicles, charging requests, charging scheduling, information about the charging processes status, energy consumptions, schedule availability for the charging, condominium energy tariffs.

The server is provided with a WEBServer application, as well as an access portal having a set of functionalities comprising:

customers registration;

users registration;

vehicles registration per user;

creation of a charging plan per user or per vehicle;

validation of a charging plan per user or per vehicle;

charging scheduling;

validation of the charging scheduling;

charging request registration;

validation of the charging request registration;

association of the electric vehicle charging unit with the user by reading the QR Code (or the like) located on the cover of the charging unit;

validation of the association of the electric vehicle charging unit with the user;

information on energy consumptions per customer;

information on energy consumptions per user or per vehicle;

graphical exhibition of energy consumptions per customer;

graphical exhibition of energy consumptions per user or per vehicle;

daily/weekly/monthly information on charging events per customer;

daily/weekly/monthly information on charging events per user or per vehicle;

graphical exhibition of charging events per customer;

graphical exhibition of charging events per user or per vehicle.

BRIEF DESCRIPTION OF THE FIGURES

For an easier understanding of the present application figures are appended, which figures depict embodiments that, however, are not meant to limit the art herein disclosed.

FIG. 1 schematically illustrates the electric vehicle charging system (1) for parking areas with shared energy supply, wherein:

1. Electric vehicle charging system;

2. Electric distribution network;

3. Electric vehicle or electric hybrid vehicle;

6. Off-grid renewable energy generation system (solar photovoltaic, wind, . . . );

7. Energy storage system for off-grid charging;

10. Electric energy meter from the power distribution company;

11. On-grid power network input in the building upstream the meter (300)/network connection;

12. On-grid power network input in the building downstream the meter (300);

13. L3 phase of the on-grid power network;
14. L2 phase of the on-grid power network;
15. L1 phase of the on-grid power network;
16. L1 phase of the off-grid power network;
17. L2 phase of the off-grid power network;
18. L3 phase of the off-grid power network;
19. Off-grid power network input in the building downstream the meter (600);
21. Off-grid power network input in the building upstream the meter (600);
30. On-grid electric switchboard of the building and respective electric protections;
60. Off-grid electric switchboard of the auxiliary circuit and respective electric protections;
100. Electric vehicle charging unit;
101. Automatic power transfer changeover switch;
102. Single-phase electric energy meter;
103. Charging unit controller module;
104. Tampering sensor (fraud attempts);
105. Power control switch (PCS);
106. Protection circuit breaker;
107. Smart socket for connection to electric vehicles or external chargers for electric vehicles;
110. Mobile communications module (LTE or the like) for the electric vehicle charging unit;
112. actuation connection between the IO port of the controller module and the automatic changeover switch;
113. connection for wired communications;
114. connection between second IO port and the tampering sensor;
121. grid connection;
122. auxiliary circuit connection;
123. automatic changeover switch output;
124. connection circuit;
125. connection circuit;
126. connection for wired or wireless communications;
127. connection circuit;
128. connection for wired or wireless communications;
130. connection circuit to the electric vehicle;
300. Electric energy meter;
501. on-grid input of the charging unit;
502. off-grid input of the charging unit;
503. auxiliary storage circuit connection input;
504. communication circuit connection input;
600. Energy meter (SmartMeter) of the off-grid auxiliary circuit equipped with a mobile communications module (LTE or the like).

Figure 2:
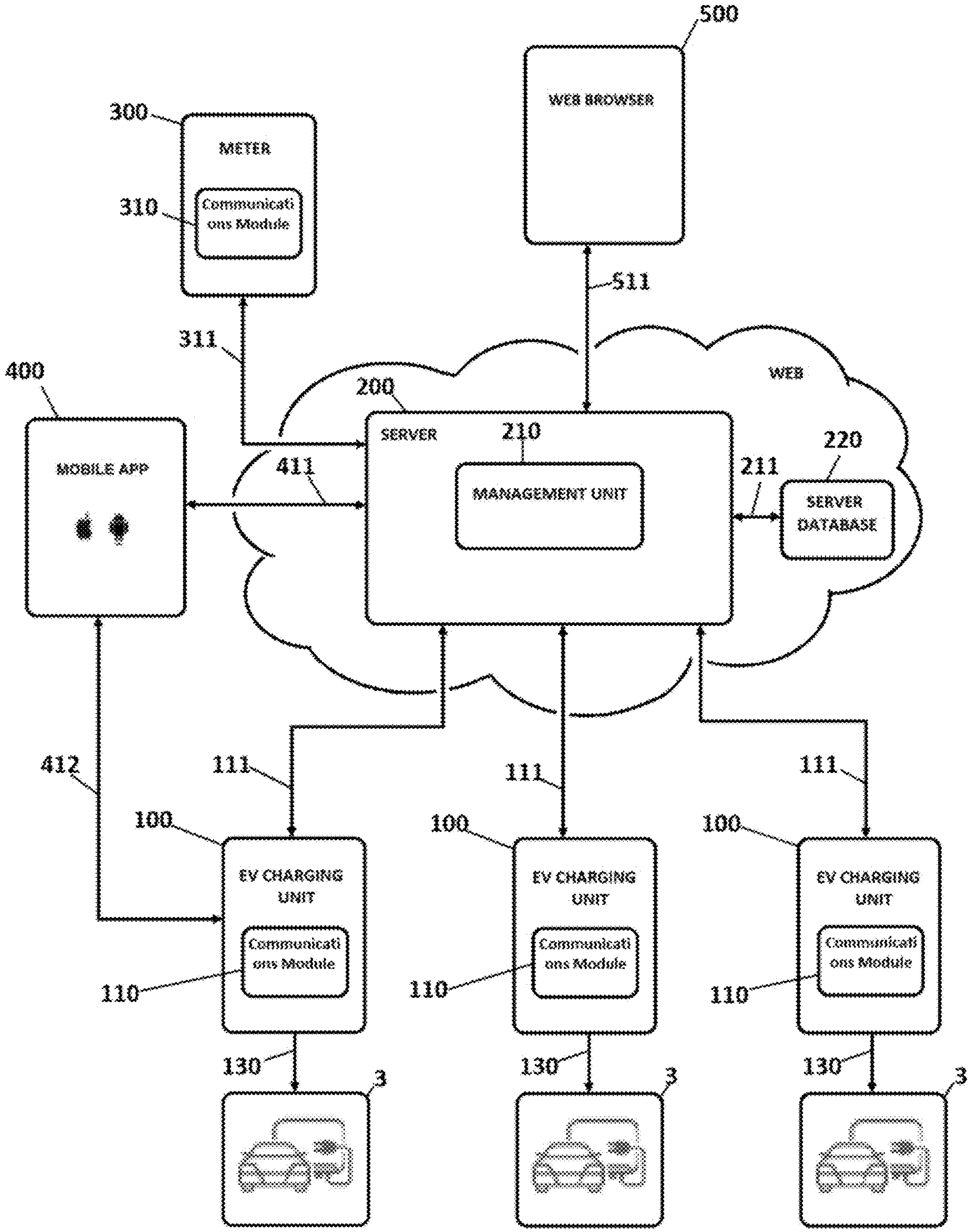

FIG. 2 illustrates an overview of the electric vehicles Charging Unit solution and the respective integration with the local and/or remote communication model with the Cloud, wherein:

3. Electric vehicle or electric hybrid vehicle;
100. Electric vehicle charging unit;
110. Mobile communications module (LTE or the like) for the electric vehicle charging unit;
111. bidirectional communications;
130. connection circuit to the electric vehicle;
200. Server installed in the cloud or remotely;
210. Management Unit;
220. Database server;
300. Electric energy meter;
310. Mobile communications module (LTE or the like) for energy meter;
311. bidirectional data connection;
400. Smartphone or the like with control application;
411. bidirectional data connection;
412. bidirectional data connection;
500. Remote computer;
511. bidirectional data connection.

Figure 3:
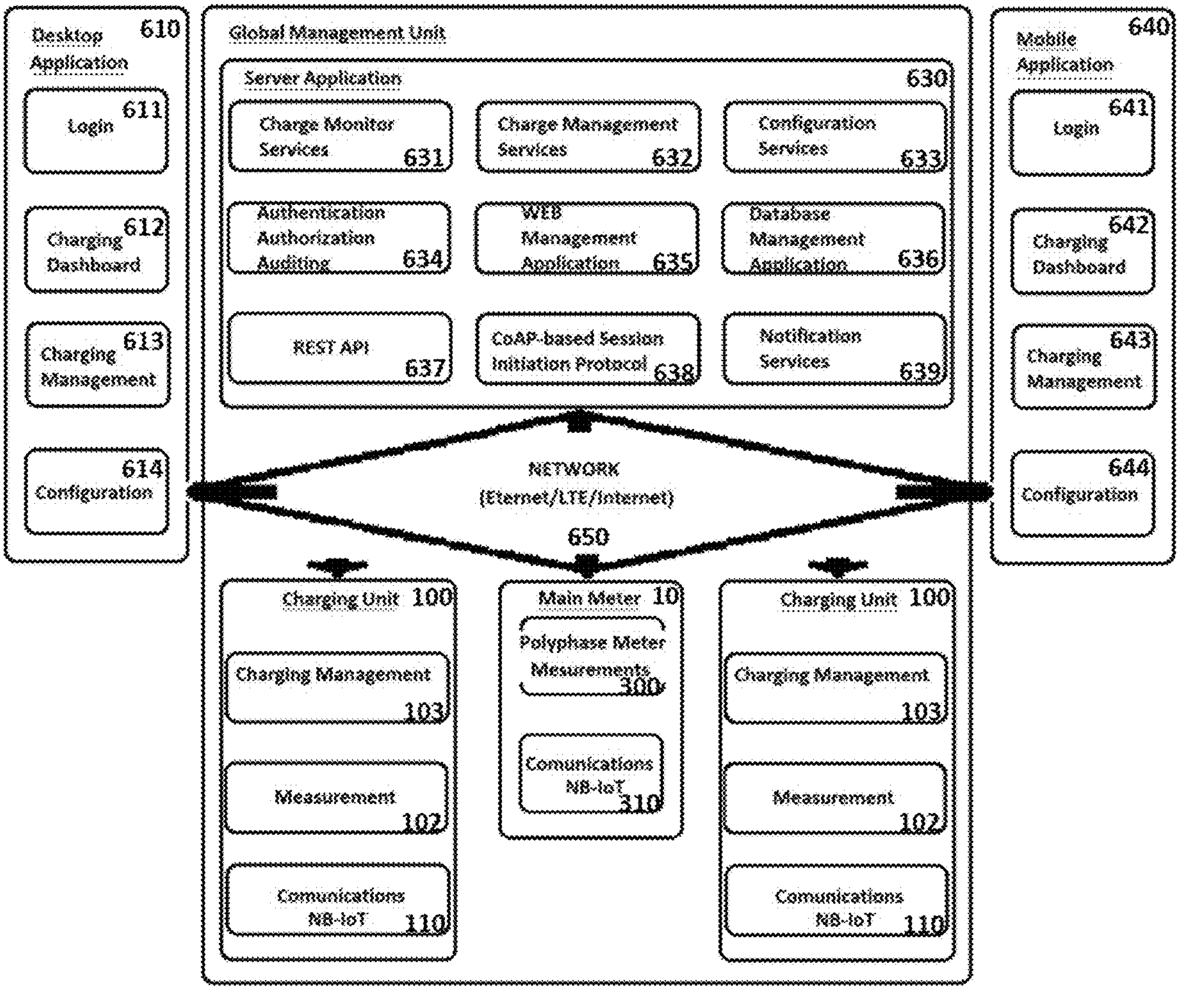

FIG. 3 illustrates the architecture of the electric vehicles charging platform represented on a macro-block view, wherein:

10. Electric energy meter from the power distribution company;
100. Electric vehicle charging unit;
103. Charging unit controller module;
110. Mobile communications module (LTE or the like) for the electric vehicle charging unit;
300. Electric energy meter;
310. Mobile communications module (LTE or the like) for energy meter;
610. desktop application;
611. login;
612. charging dashboard;
613. charging management;
614. configuration;
630. server application;
631. charge monitor services;
632. charge management services;
633. configuration services;
634. authentication authorization auditing;
635. web management application;
636. database management application;
637. rest API;
638. CoAP-based session initiation protocol;
639. notification services;
640. mobile application;
641. login;
642. charging dashboard;
643. charging management;
644. configuration;
650. network.

Figure 4:
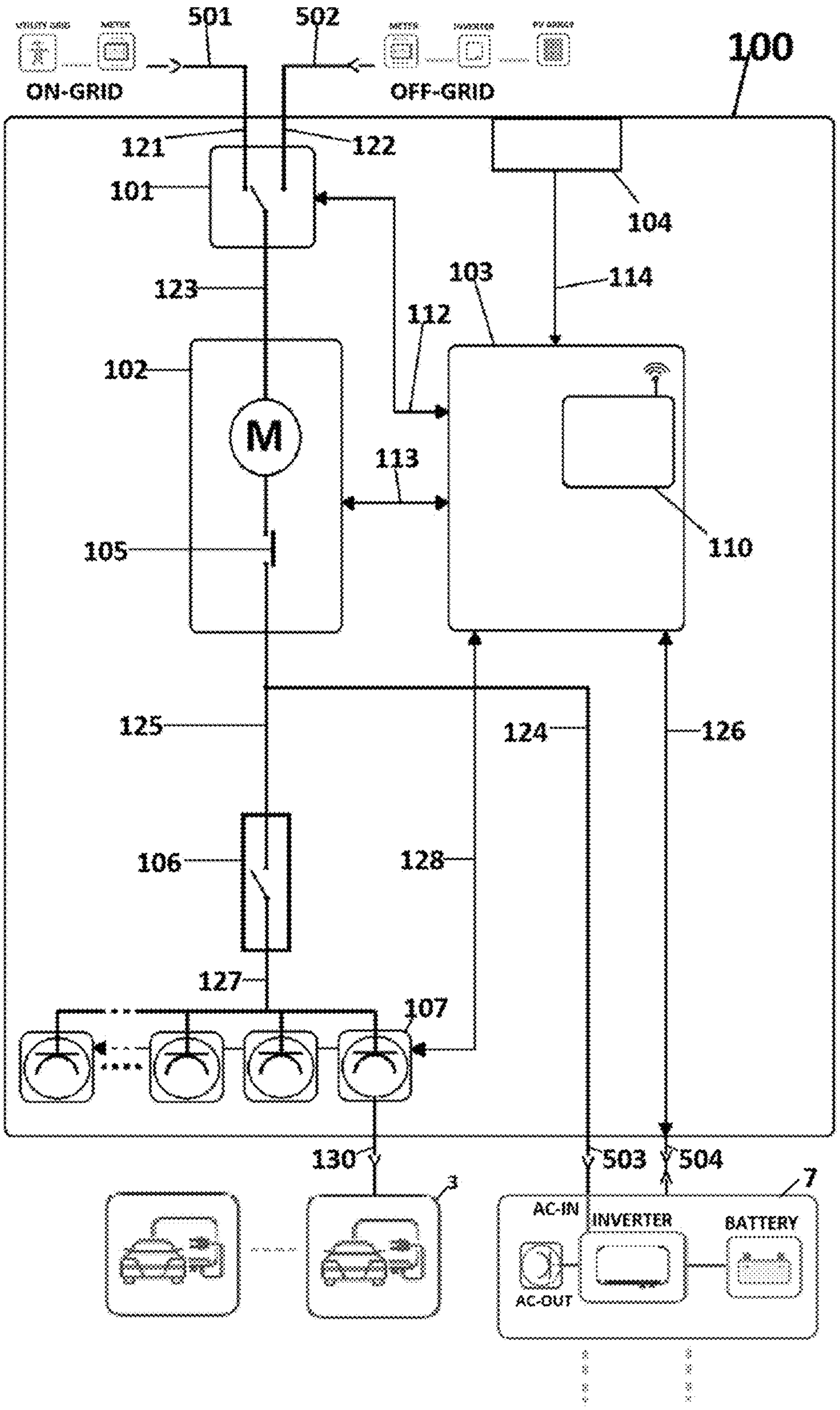

FIG. 4 illustrates the electric vehicle charging unit (100), wherein:

3. Electric vehicle or electric hybrid vehicle;
101. Automatic power transfer changeover switch;
104. Tampering sensor (fraud attempts);
103. Charging unit controller module;
105. Power control switch (PCS);
106. Protection circuit breaker;
107. Smart socket for connection to electric vehicles or external chargers for electric vehicles;
110. Mobile communications module (LTE or the like) for the electric vehicle charging unit;
112. actuation connection between the IO port of the controller module and the automatic changeover switch;
113. connection for wired communications;
114. connection between second IO port and the tampering sensor;
121. grid connection;
122. auxiliary circuit connection;
123. automatic changeover switch output;
124. connection circuit;
125. connection circuit;
126. connection for wired or wireless communications;
127. connection circuit;
128. connection for wired or wireless communications;
130. connection circuit to the electric vehicle;
501. charging unit input/wiring from the network;
502. charging unit input/wiring from the auxiliary circuit;
503. auxiliary storage circuit connection input;
504. communication circuit connection input.

Figure 5:
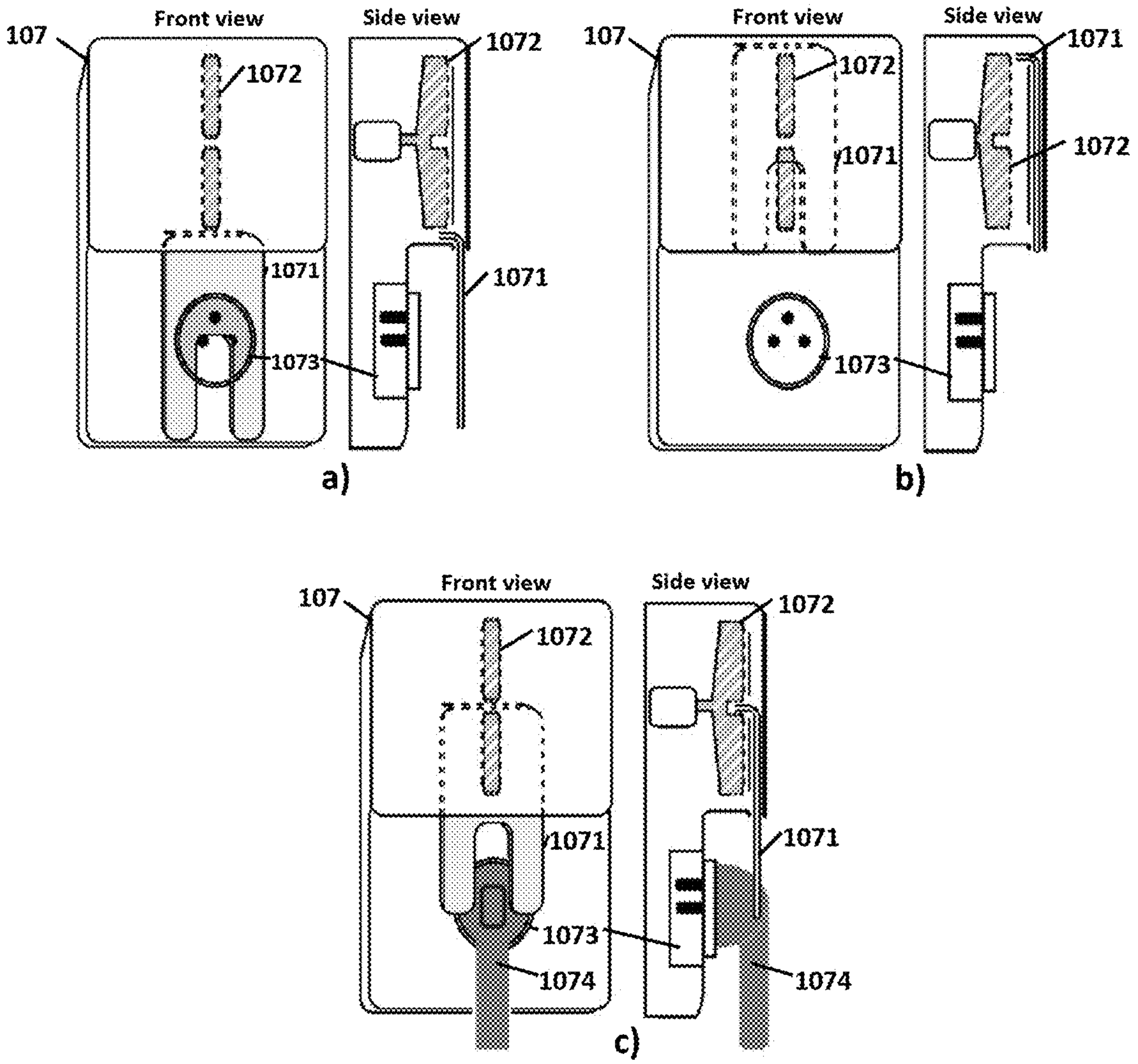

FIG. 5 illustrates three positions of the sliding obstructive lid (1071) of the smart socket (107) for electric vehicle connection, in front and side views. In these illustrations it is also possible to see that there is an electromechanical interlock (1072), with three distinct positions, responsible for the displacement of the sliding obstructive lid (1071) according to the following scenario:

a) Illustration of the smart socket (107) with no vehicle charging connector (1074) inserted in the socket (1073), with the protective lid (1071) closed/down to ensure protection and with the interlock (1072) in the first position.

b) Illustration of the smart socket (107) with no vehicle charging connector (1074) inserted in the socket (1073), with the protective lid (1071) open/up to ensure protection and with the interlock (1072) in the third position.

c) Illustration of the smart socket (107) with a vehicle charging connector (1074) inserted in the socket (1073), with the protective lid (1071) closed/down to ensure protection and/or undue unplugging of the connector (1074) from the socket (1073) and with the interlock in the second position.

DESCRIPTION OF EMBODIMENTS

Reference being made to the figures, some embodiments are now described in a more detailed way, which are not meant, however, to limit the scope of the present application.

The present invention describes a system for charging batteries (1) of electric vehicles (3) and/or hybrid vehicles to be applied in private parking places or private garages in residential multi-family or business buildings. The charging control is ensured by the management unit (210). The electric vehicle charging system (1) comprises the following elements:

at least one charging unit for electric vehicles (100);

at least one energy meter (300) comprising a mobile communications module;

at least one electric switchboard (30) with the respective network protections;

a management application (210) for the remote and/or local charging management and control;

at least one Smartphone (or the like) (400) to associate the user with the at least one charging unit for electric vehicles (100).

Figure 1:
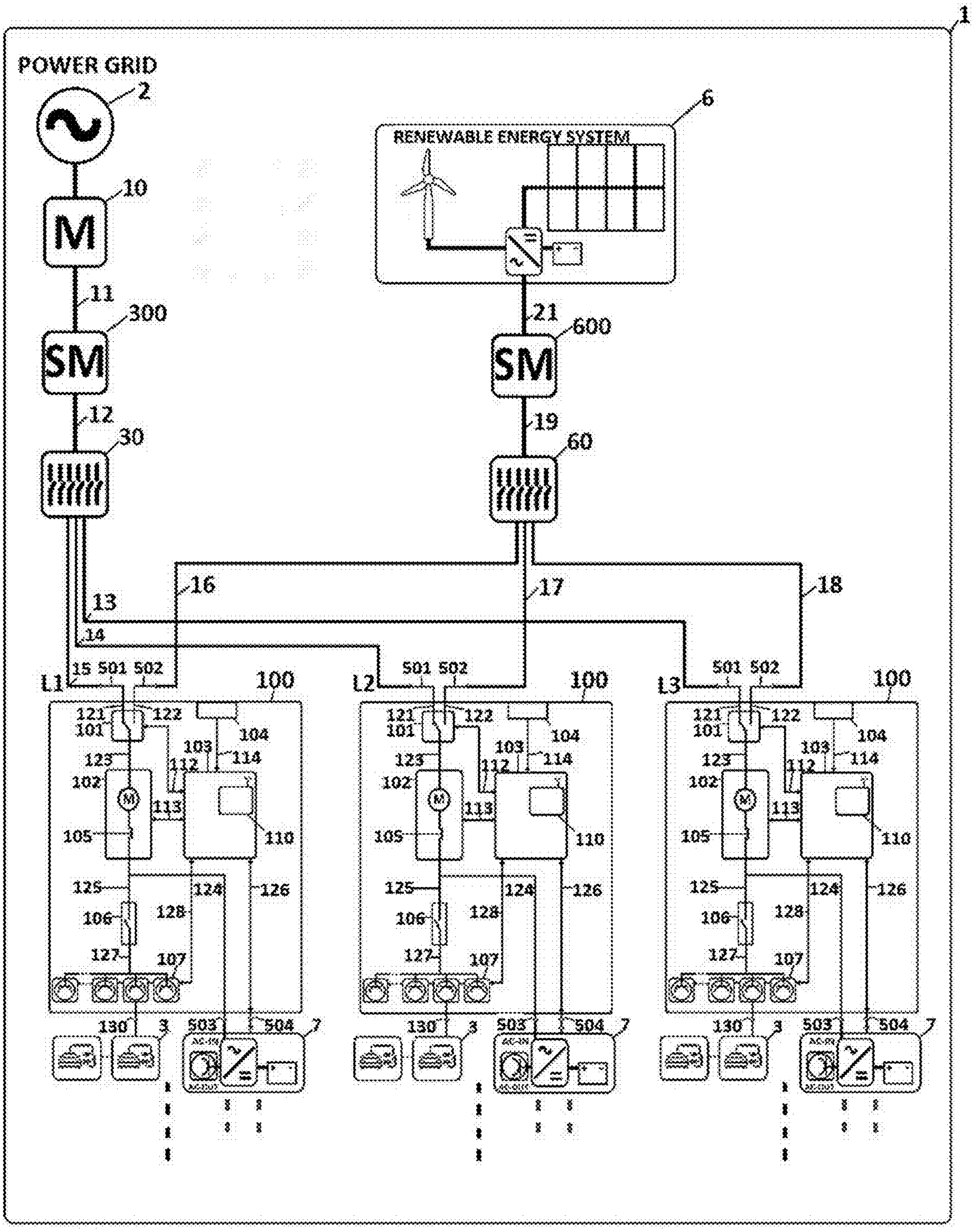

FIG. 1 illustrates a diagram describing how the connections between the principal elements comprised in the charging system (1) are made.

The input/connection (11) of electric power from the distribution network (2) is made through the electric energy meter (10) of the power distribution company. Downstream the meter (10) an energy meter (300) is installed, adapted to communicate remotely via a communications module (310), for example using an LTE mobile network, or other technically suitable for the purpose. This meter (300) output terminals will on their turn be connected to the electric switchboard of the building (30) which is responsible for feeding the circuits (13, 14, 15) L1, L2 and L3 phases of the service sockets provided in parking areas and garages where the electric vehicles (3) charging units (100) will be installed in place thereof.

The electric energy meter (300) is adapted to perform readings, and store records in the memory, determining and/or operating:

imported, exported active energy and active energy per phase;

instantaneous values of voltage and current intensity per phase;

Network frequency;

Power;

Power Factor;

memory records for critical and non-critical Alarms;

Real Time Clock (RTC) adjustment;

Power Control Switch (PCS).

The installation of the energy meter (300) is optional if the meter of the electric power distribution company (10) installed in the building has the same functionalities as the energy meter (300), allowing the connection of a communications module (310) to perform the remote readings and parameterizations mentioned above.

The charging units (100) are installed in place of existing service sockets provided in the building's common parking places or private garages.

The sockets that will not be replaced by charging units (100) will be replaced by smart sockets adapted and/or comprising a wireless communications system and/or with power control in order to limit energy consumption in common areas, and thus account for the condominium's actual consumption.

FIG. 4 illustrates the connections diagram of the principal elements comprised in the electric vehicles charging unit (100).

The charging unit (100) is provided with two inlets, one for the connection to the on-grid network (501) and the other one for the connection to the off-grid network (502), which internally connect to the automatic power transfer changeover Switch (101). Both the wiring (501) and the connection (121) are dedicated to one of the three phases (L1, L2, L3) coming from the on-grid circuit switchboard (30). Both the wiring (502) and the connection (122) are dedicated to one of the three phases (L1, L2, L3) coming from the off-grid circuit (6) switchboard (60). Similarly to the on-grid circuit provided by the network (2), the off-grid circuit (6) is connected to an energy meter (600), which on its turn is connected to the switchboard (60) housing the auxiliary electric protections of the auxiliary circuit supporting the vehicle charging (3).

The automatic power transfer changeover Switch (101) is controlled by the controller Module (103) of the charging unit (100) and adapted to operate according to the information received from the Management Unit (210) through the communications Module (110). The automatic changeover Switch (101) enables the selection of the energy supply source, whether the on-grid network (2) and/or the off-grid auxiliary circuit (6), for each of the charging Units (100).

With the solution provided, it becomes possible to install in parallel multiple charging units (100) that allow the simultaneous charging of multiple electric vehicles (3) without overloading the on-grid network infrastructure (2) locally installed, using the auxiliary off-grid circuit (6) that allows to compensate for any capacity and/or supply failures, transforming a conceptually dependent system into an autonomous and energy independent system.

The information collected and analyzed by the energy meters (300, 600), and then forwarded to the management unit (210), enables to determine which is the best solution in terms of supply network selection, whether the on-grid one (2) or the off-grid (6) one.

The automatic changeover Switch (101) has an outlet (123) with a direct connection to an electric energy Meter (102), which is responsible for the consumed energy metering at the Smart Socket (107) for electric vehicles (3) connection. The energy Meter (102) is equipped with a wired communications port responsible for providing the connection (113) and respective communications with the charging unit controller Module (103). Accordingly, the energy Meter (102) communicates with the Management Unit (210) through the charging unit controller Module (103).

The charging unit (100) controller Module (103) comprises:

- a microcontroller for hardware management;
- a wired communication port for communications with the connection (113) and with the energy Meter (102)
- a wired or wireless communication port for communications with the connection (126) and with the energy storage System (7) for off-grid charging;
- a wired or wireless communication port for communications with the connection (128) and with the Smart Sockets (107);
- an IO port for enabling the actuation connection (112) with the automatic power transfer changeover Switch (101);
- a second IO port for enabling the connection (114) with the Tampering Sensor (104);
- a mobile communications Module (110).

The energy Meter (102) comprises a PCS (105) acting according to the operating mode wherein the charging Unit (100) is provided.

In one of the existing operating modes called, for example, HIGH POWER, the PCS (105) keeps the circuit closed until the vehicle (3) batteries charging time is completed, or in case the charging current is not supplied within predefined limits for the charging mode ON CHARGE.

In another existing operating mode called LOW POWER, the PCS (105) keeps the circuit closed whenever the output current is not exceeding the predefined limit for this operating mode. In this mode, when the output current is above the limit value defined during a previously established period of time, the PCS (105) opens the circuit by interrupting the output current, and only closes back the circuit after a predetermined period of time.

The energy Meter (102) automatically controls the PCS (105) operation, which may also be controlled by remote commands through the Management Unit (210), according to the present operating mode.

The output of the energy Meter (102) is connected to the protection Circuit Breaker (106) via connection (125). On its turn, the circuit breaker (106) is connected to Smart Sockets (107) for connection to the electric vehicles (3) via connection (127).

Charging unit (100) is pre-equipped with two connection (503, 504) inputs for an auxiliary circuit comprising an energy storage System (7) for off-grid charging, which enhances the current supply capacity during electric vehicles (3) charging.

To use the auxiliary energy storage circuit (7) for off-grid charging (6), the charging unit (100) is provided with two inputs (503, 504) for wiring.

The input (503), which is connected to the circuit (124), interconnects with the AC-IN input of the auxiliary energy storage System (7). The input (504), which is connected to the circuit (126), corresponds to a wired communications connection with the charging unit (100) controller Module (103). The charging unit (100) controller Module (103) may further make the circuit (126) connection with the energy storage System (7) through wireless communication. Furthermore, it is possible to use the energy storage System (7) to help charge the vehicles (3) through a direct connection in the Socket (AC-OUT). Charging unit (100) Sockets (107), and energy storage system (7) Sockets (AC-OUT), are smart sockets capable of power integrated control for the protection against external short-circuits. These comprise a sliding obstructive lid (1071) operated by an electromechanical interlock (1072) that protects users from unintended electric discharges by not allowing the removal of the connection circuit (130) to the vehicle (3) or the battery charger when it is charging, while the charging process of the electric vehicle (3) batteries is ongoing. The connection status between the Socket (107, AC-OUT) and the Connector (1074) of cable (130) connecting to the charger or electric vehicle (3) defines the sliding obstructive lid (1071) position as illustrated in FIG. 5. According to the present operating mode in the Charging Unit (100), FIG. 5*a*) represents the lid (1071) blocked in the safety position with no charging connector (1074) inserted in the socket (1073). FIG. 5*b*) illustrates the lid (1071) unblocked, leaving the socket (1073) ready for connection (130) to the vehicle (3). Finally, in FIG. 5*c*), the protection lid (1071) is blocked in the safety position with a vehicle (3) charging connector (1074) inserted in the socket (1073).

Inserting or removing the vehicle (3) charging connector (1074) from any of the smart Sockets (7, AC-OUT), opening the lid (1071) of the charging module (100), or moving the unit (100), causes the Tampering Sensor (104) to be triggered, which informs the controller Module (103) about the status change of the connection (130) Socket-Connector. The controller Module (103) checks whether the operating mode of the charging Unit (100) allows changes in these connections. If the present mode of the charging Unit (100) does not allow changes, then the Socket (107), or the Socket (AC-OUT), will be automatically switched off, and a Tampering Attempt Alarm is sent to the Management Unit (210).

The charging Unit (100) allows the use of bidirectional chargers to carry out charging of electric vehicles (3) over the on-grid circuit, and in a cheaper tariff period, or through the renewable energy system, over an off-grid circuit. The user of the electric vehicle (3) with bidirectional charger can authorize the charge transfer to another electric vehicle (3) in a more urgent need of charge, against an agreed compensation.

The charging Units (100) and the Management System (210) record the values of the energy transferred between electric vehicles (3), and the users are informed about the respective energy transfers.

The charging unit (100) is provided with an embedded RGB LED indicating the operating status of said unit, wherein:

- LED off—indicates that the unit (100) is not in a charging mode and presents the protection Lid (1071) of socket (7) blocked in the safety position and wherein the connector (1074) is not connected;
- blue LED on—indicates that the unit (100) is in an on-grid charging mode, presenting the Lid (1071) of the socket (7) blocked in the safety position, with the charging connector (1074) inserted, but not supplying charge to the vehicle (3);
- blue LED blinking—indicates that the unit (100) is in an on-grid charging mode, presents the Lid (1071) of the socket (7) blocked in the safety position with the connector (1074) inserted, and is supplying energy for the vehicle (3) charging;
- green LED on—indicates that the charging unit (100) is in the off-grid charging mode, presents the Lid (1071) of the socket (AC-OUT) blocked in the safety position, with the connector (104) inserted, but not supplying charge to the vehicle (3);

- green LED blinking—indicates that the unit (100) is in the off-grid charging mode, presents the Lid (1071) of the socket (AC-OUT) blocked in the safety position, with the connector (1074) inserted in the Socket, and providing energy for the vehicle (3) charging;
- red LED on—indicates that the unit (100) is in a charging mode, presents the Lid (1071) blocked in the safety position, with the connector (1074) inserted in the Socket (107, AC-OUT), and the charging has been completed;
- red LED blinking intermittently fast—indicates that the unit (100) is in a communications mode and presents the Lid (1071) of the socket (107, AC-OUT) unblocked;
- red LED blinking intermittently slowly—indicates that the unit (100) is in ALARM mode, presents the Lid of the socket (107, AC-OUT) unblocked, and is not supplying energy.

The diagram illustrated in FIG. 2 describes how communications between the different units and modules comprised in the electric vehicles charging System (1) are made. The meter (300) is provided with a mobile communications module (310) to communicate with the Management Unit (210). The results of the measurements performed by the meter (300), are stored in memory to be sent later to a Management Unit (210) that is located in a remote server (200) in a Wide Area Network (WAN), or to Smart-contracts located in a Blockchain platform allowing the decentralization of the application maintaining shared information integrity. The data (311) sending is carried out according to a previously parameterized schedule, where the meter (300) takes the initiative, in response to requests from the Management Unit (210), or in case of critical alarms, by initiative of the meter (300).

Bidirectional communications (411) of the Smartphones (400) with the Management Unit (210) are performed by an APP provided on said device (400) allowing to register the user and/or the vehicle (3) in the charging management service, associate the user with the charging Unit (100) by reading and sending (412) the QR-code located on the front cover of the charging unit (100), register the connection (130) of the electric vehicle (3) to the unit (100) to start charging, inform the Management Unit (210) about the charge level of the batteries before starting charging, inform the Management Unit (210) about the minimum range required after charging, consult the charging data, schedule the charging, indicate the time at which the electric vehicle (3) is available for charging.

The communication (511) between the Management Unit (210) and a Personal Computer (500) uses a Web Browser to access the electric vehicle Charging Management Portal.

The Charging Management Portal allows to register the user or the vehicle in the charging management service, associate the user with the charging Unit (100) by inserting the charging unit (100) data, register the connection (130) of the electric vehicle (3) to the unit (100) to start the charging process, inform the Management Unit (210) about the charge level of the batteries before starting charging, inform the Management Unit (210) about the minimum range required after charging, consult the charging data, schedule the charging, indicate the time at which the electric vehicle (3) is available for charging.

The operations of the components comprised in the electric vehicle Charging Unit (100) are commanded directly by the unit's controller Module (103), and communications (111) of this Module (103) with the Management Unit (210) are carried out via the mobile communications module (110).

In the Unit (100), the meter (102) measurements, the command to open and close the PCS (105) circuit, the PCS (105) status, the command of the automatic power transfer changeover Switch (101), sending the port opening alarms, the connection to the Socket (107, AC-OUT) status, the energy storage System (7) control for off-grid charges, are functionalities controlled by the unit controller Module (103) and coordinated by the Management Unit (210) through communication connections (111) of the communication modules with the management platform.

The controller and communications Module (103) is provided with an energy reserve that allows it to communicate with the Management Unit (210) to inform that a power failure has occurred.

This functionality, called "Last Gasp", allows the Management Unit (210) to send orders to the charging Units (100) in a Charging mode on the on-grid circuit to switch to the auxiliary off-grid circuit (6), and thereby the Management Unit (210) evaluates the available energy of the auxiliary system and rearranges the time fractions of electric vehicles with pending charging.

The Management Unit (210) makes use of a time-sharing system for power supply shared among vehicles (3) and remotely coordinates the charging system (1) by:

- communicating with the Charging Units (100) to initiate or end electric vehicles (3) charging,
- communicating periodically with the energy meter (10) of the power distribution company or with the "Smartmeter" (300) for reading the measurements of instantaneous values, energy totalizers and alarms in order to control the instantaneous energy consumption of the system and thus not exceed the installed electric circuit power, whereby if the instantaneous power in either meter (10) or meter (300) reaches the value considered to be the maximum power limit of the electric circuit installed in the condominium, a Maximum Power Limit alarm is sent to the Management Unit (210) that checks which Charging Units are in charging mode and selects which of the lower priority charges should be switched off,
- communicating with the controller and communications Module (103) such that it stops charging by opening the meter (102) PCS (105) circuit or disconnects the smart socket (7) at the Charging Unit (100), and
- retaking the interrupted charging when the power returns to safe-considered values.

The system for charging electric vehicles (1) permanently manages the building's available network power, comprising

- the use of a Wide Area Network and/or a Blockchain platform, wherein the at least one server (200) is adapted to run the software of the Global Management Unit (210) that controls all operations of the system(s) for charging electric vehicles (1) installed in the parking lots and/or garages of residential, business or condominium buildings with shared electric installation of common areas, wherein
- the at least one system server (200) and/or Database Servers (220) present backup servers for redundancy, which can be used in case of failures or malfunctions,
- the use of the Blockchain platform allows the decentralization of the application and at the same time maintains the integrity of the shared information, communications between the Charging Units (100), the meters (10, 300, 600), the users' Smartphones (400) and the Management Unit (200) are carried out through the same mobile network technology (e.g., LTE, 4G, 4.5G, 5G or other suitable one) that together with the broadband service, the low latency of data transmission and the high coverage of residential areas, ensures permanent operation of the system (1) for charging electric vehicles.

The system for charging electric vehicles (1) makes use of a feature called "Peak Shaving" that allows to avoid the highest charging tariffs because, during these periods, the charging units (100) switch their energy input to the auxiliary circuit of the renewable energy Generation System (6), being also able to use their stored energy in energy storage systems (7).

The present description is not, naturally, in any way restricted to the embodiments presented herein and a person with average knowledge in the area may foresee many possibilities for modification thereof without departing from the main idea, as defined in the claims. The preferred above-described embodiments are obviously combinable with each other. The following claims further define preferred embodiments.

The invention claimed is:

1. A system for charging (1) electric vehicles (3) in parking places and garages of multi-family or business buildings, the system comprising at least one connection (11) to a local power distribution network (2);

at least one on-grid electric switchboard (30), comprising a first energy meter (300) connected to the local power distribution network (2) via the at least one connection (11), and local electric network protections;

at least one charging unit (100), comprising a first input (501) connected to the on-grid electric switchboard (30);

a second input (502) connected to the off-grid auxiliary circuit (6) comprising a renewable energy generation system and/or an energy storage system (7);

an automatic power transfer changeover switch for energy transfer (101) connected to the first input (501) and to the second input (502);

a second energy meter (102) connected to an output (123) of the automatic power transfer changeover switch (101);

a tampering sensor (104);

a controller module (103) connected to the automatic power transfer changeover switch (101), to the second energy meter (102), and to the tampering sensor (104), the controller module (103) comprising at least one port adapted for communications with the automatic power transfer changeover switch (101), the second energy meter (102) and the tampering sensor (104), and a mobile communications module (110);

a circuit breaker (106), connected to the second energy meter (102);

at least one smart socket (107), to which electric vehicles (3) are connectable, the at least one smart socket (107) is connected to the circuit breaker (106);

an RGB LED for indication of an operation status of the charging unit (100); and a capacitive sensor for interaction with a user of the electric vehicles (3);

wherein the controller module (103) is configured to control the automatic power transfer changeover switch (101), based on information received from a Management Unit (210) through the mobile communications module (110), to selectively connect the second energy meter (102) and the at least one smart socket (107) to the local power distribution network (2) through the first input (501) or to the off-grid auxiliary circuit (6) through the second input (502).

2. The system according to claim 1, wherein the second energy meter (102) comprises a power switch (105) adapted to control the output power of the at least one smart socket (107).

3. The system according to claim 1, wherein the management unit (210) is configured to control and manage charging of electric vehicles (3) connected to the at least one smart socket (107) through a time-sharing system for electric energy supply, the time-sharing system managing available power of the building electric network by means of permanent supervision and alarming.

4. The system according to claim 3, wherein the time-sharing system for electric energy supply is configured to enable charging of the electric vehicles (3) connected to the at least one smart socket (107) without exceeding the available power of the local power distribution network (2) and/or the building.

5. The system according to claim 1, wherein the at least one charging unit (100) is installed in place of a service socket provided in a parking place or garage of buildings.

6. The system according to claim 1, wherein the management unit (210) comprises a "Peak Shaving" mode in which charging of the electric vehicle (3) is carried out through the off-grid auxiliary circuit (6) using energy from of renewable energy Generation System and/or energy stored in the energy storage systems (7), and a "Last Gasp" mode in which, upon failure of power supply to the electric vehicle (3), commands the charging Units (100) to switch the off-grid auxiliary circuit (6), evaluates available charging power, and reorganizes time fractions of electric vehicles (3) with pending charging.

7. The system according to claim 1, wherein the first energy meter (300) comprises terminals for connections to at least one Phase and Neutral;

a mobile communications module (310);

at least one controller, with internal memory, configured to carry out measurements of the local power distribution network (2);

a real-time clock and an internal battery to feed the internal memory of the at least one controller; and a port for communication with the mobile communications module (310);

wherein the internal memory of the at least one controller comprises records of imported active energy and active energy in at least one Phase;

instantaneous values of Voltage in at least one Phase, Current Intensities in at least one Phase, Frequency, Power Consumed and Power Factor, and critical and non-critical Alarms.

8. The system according to claim 1, wherein the at least one smart socket (107) comprises a sliding obstructive lid (1071)

an electromechanical interlock (1072), and a socket (1073), the electromechanical interlocking (1072) being configured to automatically displace the sliding obstructive lid (1071), thereby ensuring safety and protection of the socket (1073) against undue actions.

9. The system according to claim 8, wherein the sliding obstructive lid (1071) of the smart socket (107) has three operating positions comprising:

a. a first operating position in which the sliding obstructive lid (1071) is blocked in a safety position and no charging connector (1074) of an electric vehicle (3) is inserted in the socket (1073);

b. a second operating position in which the sliding obstructive lid (1071) is unblocked;

c. a third operating position in which the sliding obstructive lid (1071) is blocked in the safety position and a charging connector (1074) of an electric vehicle (3) is inserted in the socket (1073).

10. The system according to claim 1, wherein the charging unit (100) is configured to perform on-grid or off-grid bidirectional energy transfer, between an electric vehicle (3) and an energy system via the auxiliary connection (502);

another electric vehicle (3) connected to a socket (107) of the same charging unit (100); or another electric vehicle (3) connected to a socket (107) of a different Charging unit (100) provided that the electric vehicles (3) use the same circuit phase.

11. A method of charging electric vehicles (3) using the system for charging electric vehicles (1) according to claim 1, the method comprising:

initiating, by a user of an electric vehicle (3) a charging process using a Smartphone application (400), the Smartphone application (400) collecting information about the status of charge (SoC) of batteries of the electric vehicle (3) via wireless communication;

reading, by the user, via the Smartphone application (400), a QR code provided on a front cover of a Charging Unit (100) in order to associate the charging unit (100) with the electric vehicle (3); and communicating, by the Smartphone application (400), with the Management Unit (210), wherein the communicating includes informing the management unit (210) about the association of the Charging Unit (100) with the electric vehicle (3), the SoC of the batteries, a minimum allowable range, and a date/time limit ending charging;

validating, by the Management Unit (210), the user in the System for charging electric vehicles (1);

determining, by the management unit (210), a time fraction for supplying charging power to the electric vehicle (3);

when charging can be carried out according to the requirements of the user and of the electric vehicle (3):

receiving, by the application on the Smartphone (400), a request for the user to confirm charging acceptance;

when charging cannot be carried out according to the requirements:

re-evaluating, by the Management Unit (210), a time fraction; and sending, by the management unit (210), a new proposal to the SmartPhone (400);

upon acceptance of the new proposal by the user:

sending, by the Management Unit (210), a command ordering the charging unit to (100) unblock a sliding obstructive Lid (1071) and prepare a Smart Socket (107) for connection;

plugging, by the user a charging connector (1074) of a connection cable (1074) of the electric vehicle (3) into a Socket (1073) of the smart socket (107);

actuating, by the user, a capacitive sensor to inform a controller Module (103) that the charging connector (1074) is inserted;

receiving, by the charging Unit (100), from the Management Unit (210), information to block the sliding obstructive Lid (1071) and prepare the charging Unit (100) for charging;

initiating, by the management unit (210), charging of the electric vehicle (3);

ending, by the management unit (210), charging of the electric vehicle (3);

upon completion of charging, sending an end-of-charging notification to the user;

accepting, by the user, the end-of-charging notification on the Smartphone application (400), thereby causing the sliding obstructive lid (1071) of the smart socket (107) to be unblocked;

after unplugging the charging connector (1074):

actuating, by the user, the capacitive sensor to inform the controller module (103) that the charging connector (1074) is unplugged;

wherein the sliding obstructive lid (1071) slides down and blocks access to the smart socket (107), thereby ending the charging process.

* * * * *